United States Patent
De Beaufort et al.

(10) Patent No.: US 9,747,796 B1
(45) Date of Patent: Aug. 29, 2017

(54) ONCOMING VEHICLE ALARM TECHNOLOGY

(71) Applicants: Alison Collard De Beaufort, Brooklyn, NY (US); Jonathan Collard De Beaufort, Brooklyn, NY (US); Sonia Grout De Beaufort, Brooklyn, NY (US); Jean-Francois Collard, Brooklyn, NY (US)

(72) Inventors: Alison Collard De Beaufort, Brooklyn, NY (US); Jonathan Collard De Beaufort, Brooklyn, NY (US); Sonia Grout De Beaufort, Brooklyn, NY (US); Jean-Francois Collard, Brooklyn, NY (US)

(*) Notice: Subject to any disclaimer, the term of this patent is extended or adjusted under 35 U.S.C. 154(b) by 0 days.

(21) Appl. No.: 15/208,232

(22) Filed: Jul. 12, 2016

(51) Int. Cl.
    *B60Q 1/00*    (2006.01)
    *G08G 1/0965*  (2006.01)
    *B60Q 9/00*    (2006.01)

(52) U.S. Cl.
    CPC .......... *G08G 1/0965* (2013.01); *B60Q 9/008* (2013.01)

(58) Field of Classification Search
    CPC .......... G08G 1/005; G08G 1/04; G08G 1/017; G08G 1/166
    USPC ................. 340/435, 933–944; 381/56, 92
    See application file for complete search history.

(56) References Cited

U.S. PATENT DOCUMENTS

2013/0010980 A1* 1/2013 Yoshioka ................ G01S 3/802
                                                        381/92
2015/0331095 A1* 11/2015 Sato ....................... G01S 11/14
                                                        381/56

OTHER PUBLICATIONS

M. Sakurai, "Engine Speed and its Vibration Frequency (Automobile Noise Analysis 1)", YMEC software, Introduction to Simple Sound Measurement, Apr. 2003, (downloaded from the internet on Jun. 2, 2016) (http://www.ymec.com/hp/signal2/car1.htm).

* cited by examiner

*Primary Examiner* — Kerri McNally
*Assistant Examiner* — Sharmin Akhter
(74) *Attorney, Agent, or Firm* — Patent Portfolio Builders PLLC

(57) ABSTRACT

Some embodiments of the present disclosure are directed to a method by a device for detecting an approaching vehicle. The method includes recording a sound waveform, and determining whether the recorded sound waveform is associated with a vehicle. A further determination is made whether the vehicle is approaching the device, which recorded the sound waveform, based on determining that the recorded sound waveform is indeed associated with a vehicle. An alert is generated which indicates that the vehicle is approaching the device, based on the determination that the vehicle is approaching.

14 Claims, 4 Drawing Sheets

FIGURE 4A
FIGURE 4B
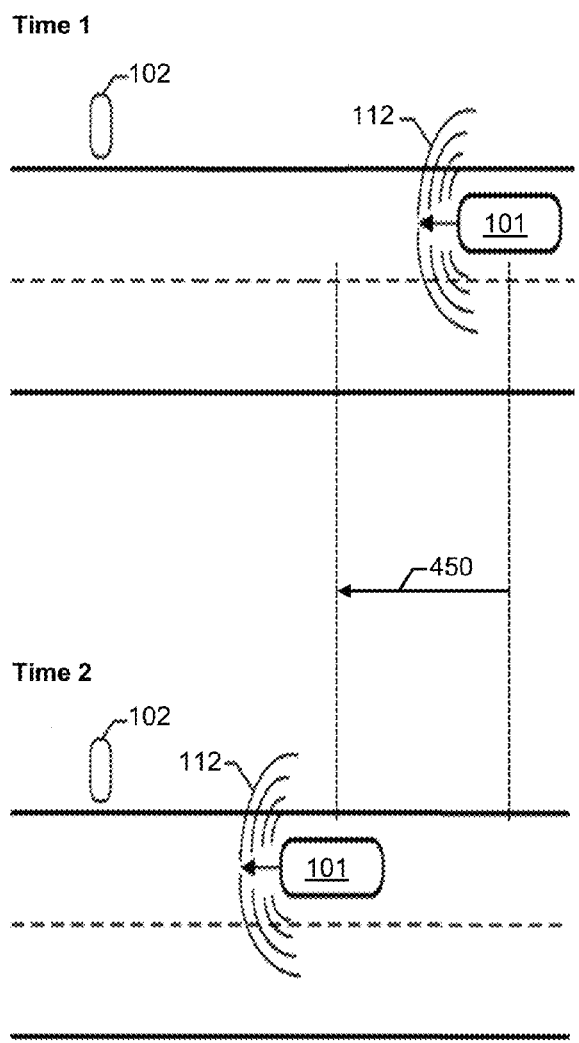
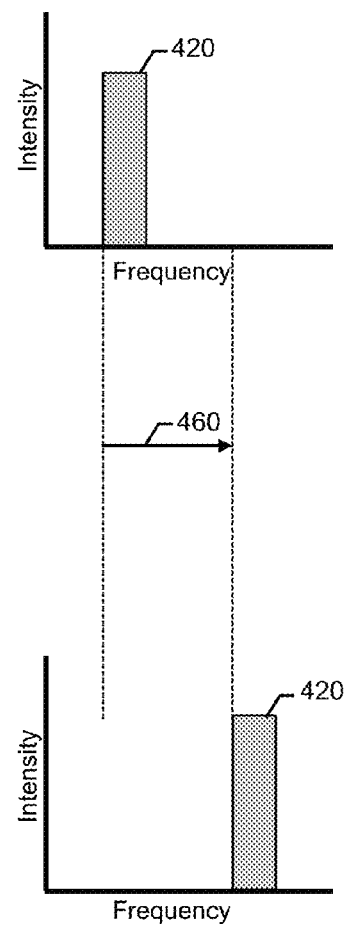

ONCOMING VEHICLE ALARM TECHNOLOGY

TECHNICAL FIELD

Embodiments of the subject matter disclosed herein generally relate to methods and systems for generating an alarm when a vehicle is approaching a person or object and, more particularly, to systems and methods which analyze ambient sounds to extract sound information associated with a vehicle and to determine whether that sound information indicates that the vehicle poses a risk to the person or object such that an alarm should be generated.

BACKGROUND

Automobiles are ubiquitous in today's society. From their introduction in the late 1800's, automobiles rapidly became a favorite mode of personal transportation, replacing the horse for local commuting and largely the train for longer distance journeys.

However, as the power, speed and sheer number of automobiles has increased, so too have the dangers posed by their use. Probably the greatest risk to pedestrians, for example, is the automobile. According to the Center for Disease Control and Prevention (CDC), in 2013, there were 4,735 pedestrians killed in traffic crashes in the United States, i.e., about one crash-related pedestrian death every 2 hours. Additionally, more than 150,000 pedestrians were treated in emergency departments for non-fatal crash-related injuries in 2013.

There are a number of tactics which pedestrians can employ to mitigate the risk posed by automobiles. For example, the CDC recommends that pedestrians travelling at night improve their visibility to the drivers of automobiles by carrying flashlights and/or wearing reflective clothing. However such techniques have been advocated for decades and are insufficient to substantially alleviate the dangers posed to pedestrians by automobiles.

Additionally, such safeguards assume ample line of sight between oncoming vehicles and pedestrians, as well as reliance on alert automobile drivers to take evasive action if they see pedestrians in their automobiles' travel paths. Neither of these assumptions may be valid under various circumstances. For example, in urban areas (like New York City), line of sight between pedestrians and oncoming vehicles may be very limited due to parked cars and buildings at traffic intersections. Exacerbating the problem further, pedestrians cannot rely upon their hearing in urban areas to alert themselves to the dangers posed by oncoming vehicles due to the typically high decibel ambient noise including a perpetually large amount of vehicle noise. Moreover, pedestrians and automobile drivers are more distracted than ever, e.g., due to text messaging or listening to music while walking or driving, rendering the unwritten contract between pedestrians and drivers to watch out for each other less viable than in past decades.

Accordingly, it would be desirable to provide techniques, systems and methods to generate alarms when vehicles are approaching a person or object to mitigate risks to pedestrians (or other objects, like other vehicles or high risk fixed structures) from oncoming vehicles.

SUMMARY

Some embodiments of the present disclosure are directed to a method by a device for detecting an approaching vehicle. The method includes recording a sound waveform, and determining whether the recorded sound waveform is associated with a vehicle. A further determination is made whether the vehicle is approaching the device, which recorded the sound waveform, based on determining that the recorded sound waveform is indeed associated with a vehicle. An alert is generated which indicates that the vehicle is approaching the device, based on the determination that the vehicle is approaching.

Some other related embodiments are directed to a device for detecting an approaching vehicle. The device includes a microphone and a processing circuitry. The microphone is configured to receive a sound waveform and transduce the sound waveform into an electrical signal. The processing circuitry transforms the electrical signal into a numerical representation of the sound waveform, and determines whether the sound waveform is associated with a vehicle. The processing circuitry then determines whether the vehicle is approaching the device based on having determined that the sound waveform is associated with a vehicle, and generates an alert when the vehicle is determined to be approaching the device.

Other methods, devices, and computer program products according to embodiments will be or become apparent to one with skill in the art upon review of the following drawings and detailed description. It is intended that all such additional methods, devices, and computer program products be included within this description and protected by the accompanying claims.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4A illustrates a vehicle approaching a device at a first time period and a second time period, and FIG. 4B shows the shift in the frequency bin associated with sound generated by the vehicle approaching the device at the corresponding time periods.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As mentioned above, it would be desirable to provide techniques, systems and methods to generate alarms when vehicles are approaching a person or object to mitigate risks to pedestrians (or to other objects, like other vehicles or fixed structures) from oncoming vehicles.

The following embodiments described herein are directed to electronic devices and methods for detecting an approaching vehicle and generating responsive alerts. These and other embodiments are described in further detail below with reference to FIGS. 1-5.

Figure 1:
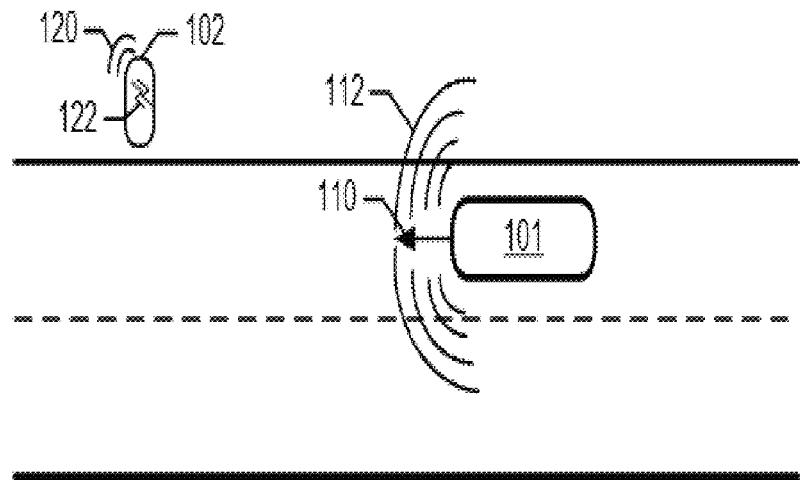
FIG. 1 illustrates a vehicle approaching an electronic device.

FIG. 1 illustrates a vehicle 101 approaching an electronic device 102. Vehicle 101 is referred to as approaching the device 102 when it has a direction of motion 110 that moves the vehicle 101 closer to the device 102 over time. The device 102 may, for example be a mobile phone, tablet computer, another vehicle, or wearable smart clothing. Wearable smart clothing includes clothing items with processing and sensing capabilities, as well as things like smart watches, smart glasses, and other smart accessories that people might wear. More details regarding such devices are provided below with respect to FIG. 5.

The device 102 is configured to detect the vehicle sound signature from a sound waveform 112, and decide whether the vehicle 101 is approaching, and if approaching, the device 102 generates an alert to the user such as by generating an audible alert 120, a visual alert or other sensorial alert 122. Sound waveform 112 may be composed of sound waveforms from many sources, not just vehicles, such that certain signal processing needs to be performed to determine if a recorded sound waveform 112 warrants generation of an alarm.

Figure 2:
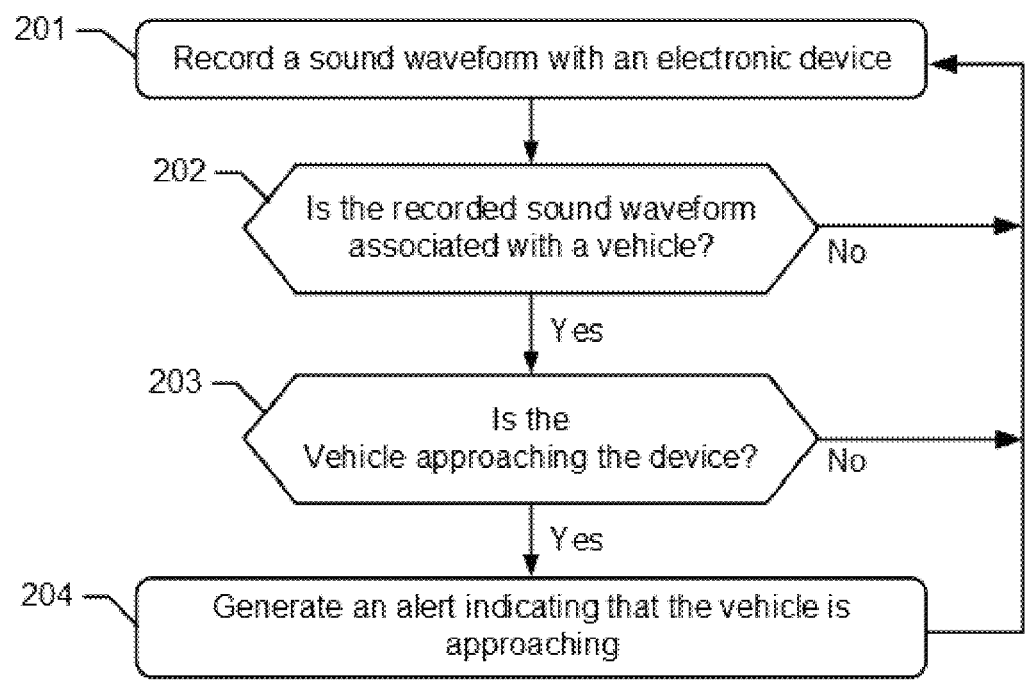
FIG. 2 is a flow chart that illustrates signal processing operations that may be performed by the device to detect an approaching vehicle and generate an alert, in accordance with some embodiments.

FIG. 2 is a flow chart that illustrates signal processing operations that may be performed by the device 102 to detect an approaching vehicle 101 and generate an alert, in accordance with some embodiments.

An embodiment for detecting an approaching vehicle 101 may comprise recording (block 201), by the device 102, a sound waveform 112, and determining (block 202), by the device 102, whether the recorded sound waveform 112 is associated with a vehicle 101. Then, based on the determination in block 202 that the recorded sound waveform 112 is associated with a vehicle 101, the device 102 determines (block 203) whether the vehicle 101 is approaching the device 102. Finally, based on the determination in block 203 that the vehicle 101 is approaching the device 102, the device 102 generates (block 204) an alert indicating that the vehicle is approaching the device. Of course if any of the decision blocks results in a "No" determination, then the process may return to step 201 where another sound sample can be recorded and processed. The device 102 and methods may be used to detect multiple vehicles 101, and is not limited to detecting a single vehicle 101.

The operations of block 202 for determining whether the recorded sound waveform 112 is associated with a vehicle will now be discussed in more detail. According to an embodiment, this involves applying one or more signal processing techniques to the recorded sound waveform to distinguish vehicle noise from other ambient noises that may be included in the recorded sound waveform. For example, block 202 may be performed based on decomposing the sound waveform 112 into a plurality of trigonometric functions that are analyzed based on a histogram thereof.

Figure 3A:
FIG. 3A illustrates a graph of intensity of the sound waveform as a function of e, in accordance with some embodiments

FIG. 3A illustrates an example graph of intensity of the sound waveform 112 as a function of time as a representation of the recorded sound waveform which has been recorded via the device's microphone and stored in memory to be processed as follows.

Figure 3B:
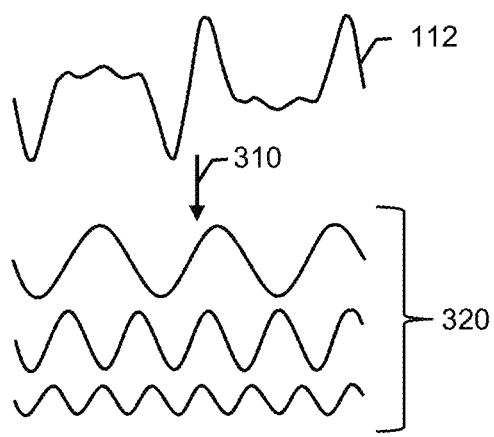
FIG. 3B illustrates the sound waveform 112 decomposed into a plurality of trigonometric functions, in accordance with some embodiments.

Referring to FIG. 3B, the processing circuitry first decomposes the sound waveform 112 into a plurality of trigonometric functions 320, e.g., sine or cosine functions, with the processing illustrated by 310. The plurality of trigonometric functions 320 is depicted, wherein each trigonometric function has a respective frequency and amplitude. Not all of the trigonometric functions of the plurality are depicted, however FIG. 3B indicates how the complex and irregular sound waveform 112 is decomposed into more regular trigonometric components.

The decomposition process 310 produces trigonometric functions, for example, by performing a Fourier Transform, represented as the operation in the equation below. A Fourier Transform decomposes the measured original signal in the time domain, represented as g(t), into a complex-valued function of the measured original signal in the frequency domain, G(f). The magnitude of a Fourier Transform represents the intensity of that frequency present in the original signal. A Discrete Fourier Transform (DFT) may be used to estimate G(f) over a frequency a discrete bandwidth R of the original signal, which may be defined as:

$$G(f) = \Im\{g(t)\} = \int_R g(t) e^{-i2\pi f t} dt$$

In another embodiment, an efficient algorithm for the calculation of a DFT, known as a Fast Fourier Transform (FFT), may be used, and in yet another embodiment, a Wavelet Transform may be used as an alternative to a Fourier Transform to generate the trigonometric functions.

Figure 3C:
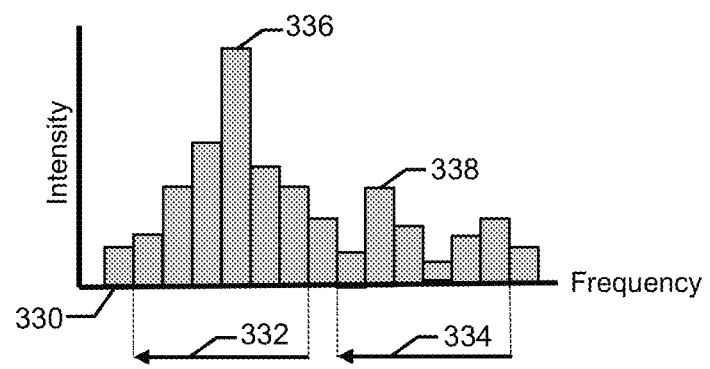
FIG. 3C illustrates an intensity versus frequency histogram that is generated by the device in the frequency domain, in accordance with some embodiments.

As another operation of block 202, the processing circuitry then takes advantage of the now regularized sound waveform components to generate an intensity versus frequency histogram using the plurality of trigonometric functions 320, an example of which is illustrated as FIG. 3C. To accomplish this each of the plurality of trigonometric functions 320 is evaluated to determine its average amplitude within a frequency bin 330 of, e.g., 20 Hz. The average amplitude for trigonometric functions for each bin can then be summed to generate the histogram. The processing circuitry evaluates the intensity values in one or more of the frequency bins to determine whether the sound waveform is associated with the vehicle 101.

In one embodiment, the sound waveform 112 may be determined to be associated with a vehicle 101 if a frequency bin 336 having a greatest intensity value among all of the bins in the histogram is disposed within a frequency range 332 that is associated with sound generated by vehicles, which may be 10 to 50 Hz.

In another embodiment, the sound waveform 112 may be determined to be associated with a vehicle 101 if an intensity value of a frequency bin having a greatest intensity value among all of the bins in the frequency range 332 associated with sound generated by vehicles, as seen at frequency bin 336, is greater than an intensity value of a frequency bin having a greatest intensity value among all of the bins in a frequency range 334 that is associated with sound generated by human voices, as seen at frequency bin 338, which may be 100 to 260 Hz.

The device 102 may operate to modify the frequency ranges 332 and 334 to improve accuracy of detecting approaching vehicles based on different factors in the computation or the environment of the device. One of these factors may be the location of the device, wherein a global positioning system (GPS) receiver circuit in the device 102 may be used to determine the expected speeds of cars in surrounding areas of the device 102, e.g., based on a database of posted speed limits associated with a surrounding area near the device, and then modify the frequency range 332 associated with sound generated by vehicles to better match the sound generated by vehicles 112 around that speed.

FIGS. 4A and 4B depict an embodiment of how block 203 may be implemented by device 102 to determine whether the detected vehicle 101 is approaching the device 102 or, conversely, is moving away from the device 102. FIG. 4A illustrates a vehicle 101 approaching the device 102, and FIG. 4B shows the shift in the highest intensity value 420 disposed within a frequency range associated with sound generated by vehicle 101 approaching the device 102. The other frequency bins in the histograms for the recorded sound are not depicted in FIG. 4B.

The processing circuitry may operate to determine whether the frequency bin 420 shifts to higher frequencies from a first time period to a second time period by evaluating the histograms of two or more sequentially recorded sound waveforms 112. The upper portions of FIGS. 4A and 4B show the vehicle 101 at a first position relative to device 102 and a first corresponding histogram at the first time period. Similarly, the bottom portions of FIGS. 4A and 4B show the vehicle 101 at a second position relative to device 102 and a second corresponding histogram at the second time period. When the vehicle 101 moves a distance 450 closer to the device 102, the Doppler Effect on the sound generated by vehicle 101 causes the frequency bins created from the vehicle sound waveform 112, depicted by the frequency bin with the highest intensity value 420, to shift to higher frequencies by the illustrated frequency shift 460.

For the purposes of this embodiment, the Doppler Effect causes an increase in frequency of the sound waveform 112 as the sound source, vehicle 101, and the sound receiver, device 102, approach each other. The faster the vehicle 101 and the device 102 approach each other, the greater the increase in frequency of the sound waveform 112. This increase in frequency is detectable on the histogram as a shift 460 in the intensity of the frequency bins to higher frequencies.

Another embodiment of block 203 can include using the processing circuitry to determine whether a magnitude of a greatest intensity value in the histogram increases from a first time period to a second time period.

In another embodiment of block 203, the processing circuitry compares at least one feature of the histogram of sound waveform 112 to at least one feature of another histogram of another recorded sound waveform.

Referring to FIGS. 1 and 2, the operations of block 204 to generate the alert may comprise generating a sensorial alert 122, such as a visual alert displayed on a display, a vibration generated by a vibration device, and/or an audible alert such as by generating sound through a speaker.

Additionally, the determined location of the device can be used to further enhance the determination of when an alert should be generated based upon the detection of an approaching vehicle as described above. For example when a pedestrian walks along a busy boulevard the aforedescribed techniques may issue an alarm or alert when a vehicle is generally approaching a device quickly but not exactly on a path which is dangerous to the device holder or wearer. By using the location of the device and linking that information to a map, the application can verify that the user is walking on a sidewalk (and hence likely not to be in danger by the approaching vehicle) or, alternatively, about to cross an intersection (and hence more likely to be in danger from the approaching vehicle). In the former case, this refinement to the basic detection scheme might not generate an alarm, wherein in the latter case it would. Although the foregoing embodiments refer to GPS as a location mechanism, those skilled in the art will appreciate that numerous other location techniques (e.g., cell ID positioning, Round Trip Timing (RTT) positioning, Observed Time Difference of Arrival (OTDOA) positioning, Assisted Global Positioning System (A-GPS) positioning, and fingerprinting positioning) could alternatively be used. Regardless of which technology is used to locate a user's device, the resulting location information can also be provided to the app or device which detects vehicles and issues alerts by another app, e.g., location tracking apps such as Google Latitude, Find My Friends, Nearby and Pathshare. Such location tracking apps return, e.g., the longitude, latitude and, optionally, a confidence indicator (indicating a likelihood that a device is actually within a certain area around the identified coordinates) to the vehicle detection app which can then use that information to improve its decision making regarding when to issue an alarm.

Figure 5:
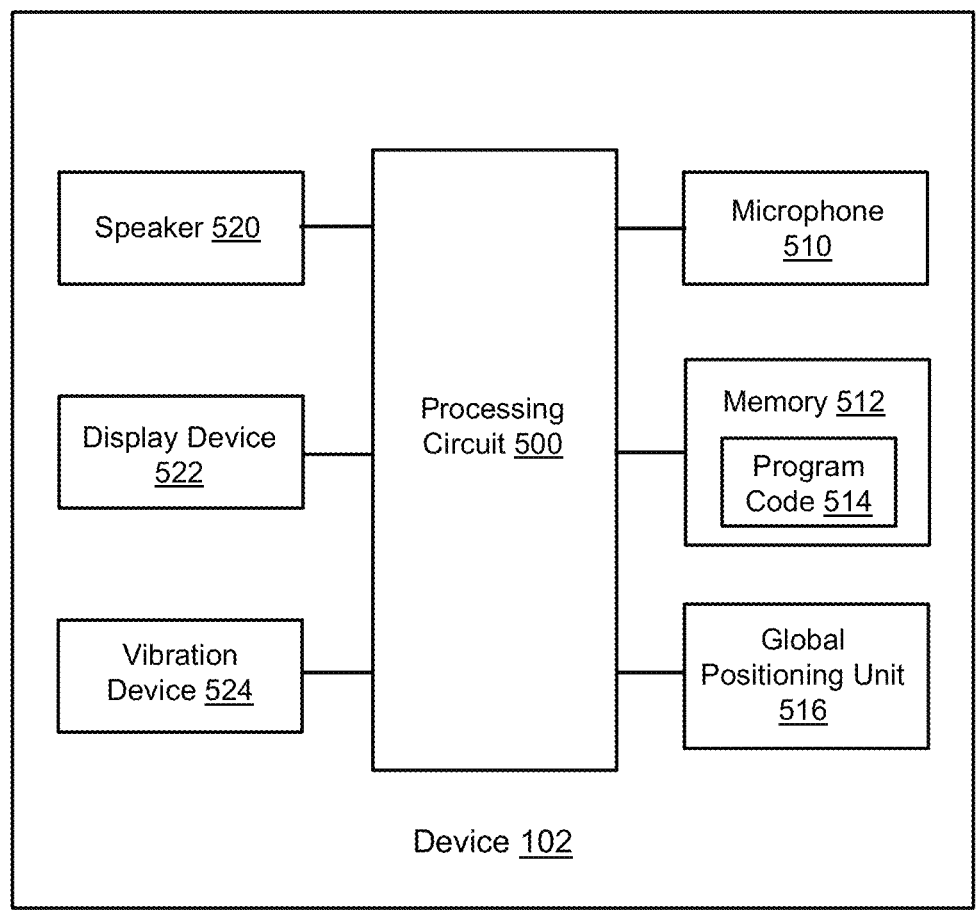
FIG. 5 is a block diagram of the possible components comprising the device 102, in accordance with some embodiments.

FIG. 5 is a block diagram of the possible components comprising the device 102 according to some embodiments of the present disclosure. The device 102 may include a processing circuit 500, a microphone 510, a memory 512, a global positioning unit (GPS) 516 (or alternatively an RF transceiver which can connect to the Internet and receive location information from a location app as described above), and an alert generating device or devices which may include a speaker 520, a display device 522 (e.g., LCD or LED display), and/or a vibration device 524. The device 102 may be configured to use the microphone 510 for receiving (block 201) the sound waveform 112 and transducing the sound waveform 112 into an electrical signal.

The processing circuit 500 may include one or more data processing circuits, such as a general purpose and/or special purpose processor (e.g., microprocessor and/or digital signal processor). The processing circuit 500 is configured to execute computer program code 514 in the memory 512, such as a non-transitory computer readable medium, to perform at least some of the operations described herein as being performed by a device 102. The program code 514 when executed by the processing circuit 500 causes the processing circuit 500 to perform operations in accordance with one or more embodiments disclosed for the device 102.

With reference to FIG. 2, some of the operations executed by the processing circuit 500 include: transforming the electrical signal into a numerical representation of the sound waveform 112; determining (block 202) whether the numerical representation of the sound waveform 112 is associated with a vehicle; determining further (block 203) whether the vehicle is approaching the device 102 based on the sound waveform 112 being associated with a vehicle; and responsively generating (block 204) an alert from the device 102 indicating to a user that vehicle 101 is approaching the user if the vehicle 101 is determined to be approaching the device 102.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for detecting an approaching vehicle comprising:
   recording, by a device, a sound waveform;
   determining, by the device, whether the recorded sound waveform is associated with a vehicle;
   determining, by the device, whether the vehicle is approaching the device which recorded the sound waveform, based on the determination that the recorded sound waveform is associated with a vehicle;
   generating, by the device, an alert indicating that the vehicle is approaching the device, based on the determination that the vehicle is approaching the device;
   wherein the step of determining, by the device, whether the recorded sound waveform is associated with a vehicle comprises:
   decomposing the sound waveform into a plurality of trigonometric functions;
   generating an intensity versus frequency histogram using the plurality of trigonometric functions,
   wherein each of a plurality of frequency bins are assigned an intensity value based on the plurality of trigonometric functions;
   evaluating the intensity values in one or more of the frequency bins to determine whether the sound waveform is associated with the vehicle; and
   wherein the step of evaluating further comprises:
   determining that the sound waveform is associated with a vehicle if an intensity value of a frequency bin having a greatest intensity value among all of the bins in a frequency range associated with sound generated by vehicles is greater than an intensity value of a frequency bin having a greatest intensity value among all of the bins in a frequency range associated by sound generated by human voices.

2. The method of claim 1, wherein the device is one of a mobile phone, tablet computer, another vehicle, and wearable smart clothing.

3. The method of claim 1, wherein the step of evaluating further comprises: determining that the sound waveform is associated with a vehicle if a frequency bin having a greatest intensity value among all of the bins in the histogram is disposed within a frequency range associated with sound generated by vehicles.

4. The method of claim 1, wherein the step of determining, by the device, whether the vehicle is approaching the device which recorded the sound waveform further comprises: determining whether a frequency bin having a greatest intensity value disposed within a frequency range associated with sound generated by vehicles shifts to higher frequencies from a first time period to a second time period.

5. The method of claim 1, wherein the step of determining, by the device, whether the vehicle is approaching the device which recorded the sound waveform further comprises: determining whether a magnitude of a greatest intensity value in the histogram increases from a first time period to a second time period.

6. The method of claim 1, wherein the step of determining, by the device, whether the vehicle is approaching the device which recorded the sound waveform further comprises: comparing at least one feature of the histogram to at least one feature of another, subsequently generated histogram based on another recorded sound waveform.

7. The method of claim 1, further comprising:
   determining a current location of the device; and
   generating, by the device, an alert indicating that the vehicle is approaching the device, based on the determination that the vehicle is approaching the device and the current location of the device.

8. A device for detecting an approaching vehicle comprising:
   a microphone for receiving a sound waveform and transducing the sound waveform into an electrical signal;
   processing circuitry for transforming the electrical signal into a numerical representation of the sound waveform which numerical representation is used to:
   determine whether the sound waveform is associated with a vehicle;
   determine whether the vehicle is approaching the device, based on the determination that the recorded sound waveform is associated with a vehicle; and
   generate an alert when the vehicle is approaching the device, based on the determination that the vehicle is approaching the device;
   wherein the processing circuitry is configured to determine whether the sound waveform is associated with a vehicle by:
   decomposing the sound waveform into a plurality of trigonometric functions;
   generating an intensity versus frequency histogram using the plurality of trigonometric functions, wherein each of a plurality of frequency bins are assigned an intensity value based on the plurality of trigonometric functions; and
   evaluating the intensity values in one or more of the frequency bins to determine whether the sound waveform is associated with the vehicle; and
   wherein the processing circuitry is configured to perform the evaluating by:
   determining that the sound waveform is associated with a vehicle if an intensity value of a frequency bin having a greatest intensity value among all of the bins in a frequency range associated with sound generated by vehicles is greater than an intensity value of a frequency bin having a greatest intensity value among all of the bins in a frequency range associated by sound generated by human voices.

9. The device of claim 8, wherein the device is one of a mobile phone, tablet computer, another vehicle, and wearable smart clothing.

10. The device of claim 8, wherein the processing circuitry is configured to perform the evaluating by: determining that the sound waveform is associated with a vehicle if a frequency bin having a greatest intensity value among all of the bins in the histogram is disposed within a frequency range associated with sound generated by vehicles.

11. The device of claim 8, wherein the wherein the processing circuitry is configured to perform the determination of whether the vehicle is approaching the device which recorded the sound waveform by: determining whether a frequency bin having a greatest intensity value disposed within a frequency range associated with sound generated by vehicles shifts to the right from a first time period to a second time period.

12. The device of claim 8, wherein the wherein the processing circuitry is configured to perform the determination of whether the vehicle is approaching the device which recorded the sound waveform by: determining whether a magnitude of a greatest intensity value in the histogram increases from a first time period to a second time period.

13. The device of claim 8, wherein the wherein the processing circuitry is configured to perform the determination of whether the vehicle is approaching the device which recorded the sound waveform by: comparing at least one feature of the histogram to at least one feature of another, subsequently generated histogram based on another recorded sound waveform.

14. The device of claim 8, wherein the processing circuitry determines or receives a current location of the device and wherein the processing circuitry is configured to generate the alert indicating that the vehicle is approaching the device, based on the determination that the vehicle is approaching the device and the current location of the device.

\* \* \* \* \*